United States Patent Office 2,877,199
Patented Mar. 10, 1959

2,877,199

DENTAL COMPOSITION COMPRISING SYNTHETIC POLYMER, SOLVENT THEREFOR, AND INORGANIC FILLER

George Taub, Jersey City, N. J.

No Drawing. Application August 1, 1956
Serial No. 601,346

9 Claims. (Cl. 260—32.8)

This invention relates to a dental preparation for cavity lining and pulp capping to a cavity in a tooth prior to the application of a dental cement and metal or other cavity filling material.

A dental cavity lining preparation is used to protect the dental pulp against undesirable chemical, thermal and other pulp irritating stimuli. In addition, it provides a suitable base upon which a cavity filling material can be applied. Heretofore, a number of cavity lining preparations have been available and have been used but often fail to provide all of the advantages expected from them. To be useful and serve its desired purpose, it is necessary for a cavity lining preparation to be fixed or firmly set in the cavity before proceeding to apply dental cement and the cavity filling material. The speed with which such lining preparation sets is also of practical importance in order that the cavity being worked upon may be promptly taken care of without great delays and discomfort to the patient. It is also necessary and desirable that the lining preparation be "kind" to the pulp of the tooth and will not cause irritation upon application or over prolonged periods.

It is an object of this invention to provide an improved cavity lining preparation which sets quickly and prevents prolonged delays and discomfort to the patient while it is being applied and permits the ready application of a dental cement and metal or other cavity filling material immediately after application of the lining preparation.

It is a further object of this invention to provide an improved cavity lining preparation which protects the dental pulp from undesirable chemical, thermal or other pulp irritating stimuli.

Another object of this invention is to provide an improved cavity lining preparation which may be prepared well in advance of application and stored over periods of time rather than it being required to immediately mix and blend ingredients shortly before the actual use or application of the lining material.

Other objects and advantages will be readily apparent as the description below proceeds.

Broadly stated this invention relates to a dental preparation for cavity lining and pulp capping comprising a mixture of a polymerized ester selected from the group consisting of ethyl and methyl methacrylate polymers and their copolyers, vinyl chloride and vinyl acetate resins and their copolymers and polystyrene resins, in a solvent therefor, calcium hydroxide and an inert suspending agent, said suspending agent constituting from .2% to 2.75% by weight of said preparation.

More particularly, this invention relates to a dental preparation for cavity lining and pulp capping comprising a mixture of a solution of an ethyl or methyl methacrylate or their copolymer in a suitable solvent, calcium hydroxide and from .2% to 2.75% by weight of an inert bentonite finely divided clay.

One of the important component parts of this improved dental preparation is the resinous material employed. Such material must be essentially non-toxic and also be capable of providing a satisfactory film to protect the dental pulp against irritating stimuli. The resinous substances that have been found suitable for the purposes of the present invention, either alone or in compatible mixtures when desired include ethyl and methyl methacrylate polymers and their copolymers, vinyl chloride and vinyl acetate resins and their copolymers and polystyrene resins.

It is a general characteristic of such resins that they form films from their solution by solvent evaporation. The films formed when employing polymerized esters of such resins exhibit exceptional resistance to vegetable oils, mineral oils, greases, water, alcohol, alkali and acid. Such films further possess a good resistance to discoloration.

Polymerized acrylic, vinyl and polystyrene resins vary greatly in their physical characteristics, depending not only on the chemical composition of the monomers employed, but also on the polymerization conditions used. The methyl esters of acrylic acid, such as the methacrylate polymers, are generally harder and tougher than the ethyl methacrylate esters and therefore are particularly suited for use as good film formers in the cavity lining material of this invention. Physical mixtures of various acrylic polymers often do not indicate good compatibility; however, combinations of such polymers are often produced by mixing various monomeric esters prior to the polymerization step.

A particularly effective resin for this purpose and one preferred for use in the preparation of this improved cavity lining preparation is a polymerized ethyl or methyl methacrylate in a methyl ethyl keton solution.

In addition, many other suitable resinous materials are available and such include various polymers and copolymers of ethyl and methyl methacrylate, vinyl chloride, vinyl acetate and polystyrene resins.

It is necessary that all resinous materials used in this invention be provided in a suitable non-injurious solvent therefor. In addition, such solvent must be capable of rapid evaporation so as to assist in the rapid forming and setting of the resin film. Various solvents are available and well known for this purpose. Methyl ethyl ketone is particularly effective as a suitable solvent as it is a good solvent for the resinous materials employed which is not irritating to the pulp of the tooth and it also is a rapidly evaporating solvent. Among suitable solvents for the resinous materials may be included ethyl acetate, chloroform, toluene, ethylene dichloride and Cellosolve.

A further component part of the cavity lining preparation is calcium hydroxide $Ca(OH)_2$. While various other forms of alkaline calcium compounds have found use in the past in dental cavity linings, preferred results are secured in the present invention when employing the use of calcium hydroxide. One essential contribution of this material is to provide the desired alkalinity in the oral area; however, in addition, calcium hydroxide further provides a non-irritating source of alkalinity which will blend into the mixture so as to form an improved texture for the dental preparation.

A further component part of my dental preparation is an inert filler material. Material suitable for use for this purpose include a number of bentonite finely divided clays. The bentonite clays are essentially sodium montmorillonite having the characteristic that they swell when wetted and, therefore, provide good use as a suspending agent in the cavity lining preparation of this invention. Bentonite is generally available as a finely divided cream colored powder and tends to form an expanded gel-lattice structure in organic media. Two products found to be especially suitable for use in this invention are those manufactured by the National Lead Company and sold under their trade names Bentone 18 and Bentone 34. Preferred results have been secured when using this Bentone 18 material.

The preparation of the mixture which comprises this invention consists primarily of blending the resinous material in a suitable solvent with the calcium hydroxide and bentonite. This may be accomplished on any conventional mixing apparatus. The calcium hydroxide and bentonite then may be added and ground in a pebble mill. The consistency of the final product is of great importance and should be so as to permit ready application on the desired area of the tooth to be treated. In order to get the lining material to a free flowing consistency, sufficient solvent is added for this purpose but it still retains sufficient body in the mixture to create film.

Wide latitude may be used in the proportions of the various ingredients of the mixture in order to produce a mixture of a workable consistency that will set and dry rapidly to form a satisfactory film or pulp capping over the cavity. Variations in the proportions of the ingredients in general affect the viscosity of the mixture and consequently the length of the period of drying or setting.

It is a feature of this invention that once the mixture has been prepared as above described there is little tendency for it to settle out and will not separate. It can be prepared well in advance of its use and stored for periods of time, often requiring only a shake of its container to thoroughly mix any ingredients which may tend to separate out.

To further illustrate the material of this invention, presented below are a number of examples illustrating the materials that I have employed and the proportions thereof. The percentages expressed below are percentages by weight of the total mixture. Some resins are commercially sold in a solvent. When such starting material is used, additional solvent should be added, when necessary to bring the total solvent present up to the percentages shown. For convenience these examples have been divided into groups determined by the starting materials used. In each of these examples the materials were mixed and milled together as earlier described.

Group I examples

In this group the starting materials were methyl methacrylate polymer, methyl ethyl ketone, calcium hydroxide and Bentone 18.

|    | Polymer Solids, percent | Solvent, percent | Ca(OH)$_2$, percent | Bentone 18, percent |
|----|---|---|---|---|
| 1  | 25    | 39.5  | 35    | 0.5  |
| 2  | 22    | 33    | 42.50 | 2.50 |
| 3  | 20    | 49.3  | 30    | 0.7  |
| 4  | 20    | 47.75 | 30    | 2.25 |
| 5  | 15    | 64    | 20    | 1    |
| 6  | 15    | 57.50 | 25    | 2.50 |
| 7  | 15    | 52.47 | 30    | 2.53 |
| 8  | 13.39 | 57.31 | 27.00 | 2.30 |
| 9  | 12.10 | 61.80 | 24    | 2.10 |
| 10 | 12    | 62    | 25    | 1    |
| 11 | 10    | 78    | 10    | 2    |
| 12 | 10    | 53    | 35    | 2    |
| 13 | 5     | 63.50 | 30    | 1.50 |
| 14 | 5     | 52.25 | 40    | 2.75 |
| 15 | 3     | 70    | 25    | 2    |

Group II examples

In this group the starting materials were ethyl methacrylate polymer, methyl ethyl ketone, calcium hydroxide and Bentone 18.

|    | Polymer Solids, percent | Solvent, percent | Ca(OH)$_2$, percent | Bentone 18, percent |
|----|---|---|---|---|
| 16 | 25 | 39.5  | 35    | 0.5  |
| 17 | 22 | 33    | 42.50 | 2.50 |
| 18 | 20 | 49.3  | 30    | 0.7  |
| 19 | 15 | 64    | 20    | 1    |
| 20 | 15 | 52.47 | 30    | 2.53 |
| 21 | 10 | 78    | 10    | 2    |
| 22 | 5  | 63.50 | 30    | 1.50 |

Group III examples

In this group the starting materials were a combination of ethyl and methyl methacrylate copolymers, methyl ethyl ketone, calcium hydroxide and Bentone 18.

|    | Copolymer Solids, percent | Solvent, percent | Ca(OH)$_2$, percent | Bentone 18, percent |
|----|---|---|---|---|
| 23 | 25 | 59.50 | 15 | 0.50 |
| 24 | 20 | 59.50 | 20 | 0.50 |
| 25 | 15 | 59    | 25 | 1    |
| 26 | 10 | 58    | 30 | 2    |
| 27 | 5  | 57.50 | 35 | 2.50 |

Group IV examples

In this group the starting materials were vinyl chloride polymer, methyl ethyl ketone, calcium hydroxide and Bentone 18.

|    | Polymer Solids, percent | Solvent, percent | Ca(OH)$_2$, percent | Bentone 18, percent |
|----|---|---|---|---|
| 28 | 25 | 58.5 | 15 | 1.50 |
| 29 | 20 | 58   | 20 | 2    |
| 30 | 15 | 52   | 31 | 2    |
| 31 | 10 | 59.4 | 30 | 0.6  |
| 32 | 5  | 53   | 40 | 2    |

Group V examples

In this group the starting materials were a combination of vinyl chloride and vinyl acetate copolymers, methyl ethyl ketone, calcium hydroxide and Bentone 18.

|    | Copolymer Solids, percent | Solvent, percent | Ca(OH)$_2$, percent | Bentone 18, percent |
|----|---|---|---|---|
| 33 | 25 | 58.5 | 15    | 1.50 |
| 34 | 22 | 33   | 42.50 | 2.50 |
| 35 | 20 | 58   | 20    | 2    |
| 36 | 15 | 52   | 31    | 2    |
| 37 | 10 | 59.4 | 39    | 0.6  |
| 38 | 5  | 53   | 40    | 2    |

Group VI examples

In this group the starting materials were polystyrene polymer, methyl ethyl ketone, calcium hydroxide and Bentone 18.

|    | Polymer Solids, percent | Solvent, percent | Ca(OH)$_2$, percent | Bentone 18, percent |
|----|---|---|---|---|
| 39 | 25 | 49.8  | 25    | 0.2  |
| 40 | 22 | 33    | 42.50 | 2.50 |
| 41 | 20 | 59.5  | 20    | 0.5  |
| 42 | 15 | 59    | 25    | 1    |
| 43 | 10 | 58.50 | 30    | 1.50 |
| 44 | 5  | 57.50 | 35    | 2.50 |

Group VII examples

In this group the starting materials were methyl methacrylate polymer, chloroform, calcium hydroxide and Bentone 18.

|    | Polymer Solids, percent | Solvent, percent | Ca(OH)$_2$, percent | Bentone 18, percent |
|----|---|---|---|---|
| 45 | 30 | 54.50 | 15 | 0.50 |
| 46 | 20 | 49.50 | 30 | 0.50 |
| 47 | 15 | 58    | 25 | 2    |
| 48 | 10 | 69.50 | 20 | 0.50 |
| 49 | 5  | 64    | 30 | 1    |

Group VIII examples

In this group the starting materials were methyl methacrylate polymer, a mixture of methyl ethyl ketone and chloroform, calcium hydroxide and Bentone 18.

| | Polymer Solids, percent | Solvent | | Ca(OH)₂, percent | Bentone 18, percent |
|---|---|---|---|---|---|
| | | MEK, percent | CHL, percent | | |
| 50 | 25 | 37.50 | 21.50 | 15 | 1 |
| 51 | 20 | 30 | 34.50 | 15 | 0.50 |
| 52 | 15 | 22.50 | 36 | 25 | 1.50 |
| 53 | 10 | 15 | 54 | 20 | 1 |
| 54 | 5 | 7.5 | 55.5 | 30 | 2 |

Group IX examples

In this group the starting materials were methyl methacrylate polymer, ethyl acetate, calcium hydroxide and Bentone 18.

| | Polymer Solids, percent | Solvent, percent | Ca(OH)₂, percent | Bentone 18, percent |
|---|---|---|---|---|
| 55 | 22 | 33 | 42.50 | 2.50 |

I claim:

1. A dental preparation for cavity lining and pulp capping comprising a bodied free flowing mixture containing from about 3% to 30% by weight of a polymerized resin selected from the group consisting of polymethyl methacrylate, polyethyl methacrylate, copolymers of methyl methacrylate and ethyl methacrylate, polyvinyl chloride, polyvinyl acetate, copolymers of vinyl chloride and vinyl acetate and polystyrene in a non-irritating solvent therefor capable of rapid evaporation, calcium hydroxide constituting from 10% to 42.50% by weight of said preparation and a bentonite clay, said bentonite clay constituting from .2% to 2.75% by weight of said preparation.

2. A dental preparation for cavity lining and pulp capping comprising a bodied free flowing mixture containing from about 3% to 30% of polymethyl methacrylate in non-irritating solvent therefor capable of rapid evaporation, calcium hydroxide constituting from 10% to 42.50% by weight of said preparation and a bentonite finely divided clay, said bentonite clay constituting from .2% to 2.75% by weight of said preparation.

3. A dental preparation in accordance with claim 2 wherein said polymethyl methacrylate in a solvent therefor, and said calcium hydroxide are present in substantially equal parts by weight.

4. A dental preparation in accordance with claim 2 wherein said polymethyl methacrylate in a solvent therefor, and said calcium hydroxide are present in substantially equal parts by weight, and said solvent is methyl ethyl ketone.

5. A dental preparation for cavity lining and pulp capping comprising a bodied free flowing mixture containing from about 3% to 30% of polyethyl methacrylate in a calcium hydroxide in a non-irritating solvent therefor capable of rapid evaporation, calcium hydroxide constituting from 10% to 42.50% by weight of said preparation and a bentonite finely divided clay, said bentonite clay constituting from .2% to 2.75% by weight of said preparation.

6. A dental preparation for cavity lining and pulp capping comprising a bodied free flowing mixture containing from about 3% to 30% of a vinyl chloride and vinyl acetate copolymer in a non-irritating solvent therefor capable of rapid evaporation, calcium hydroxide constituting from 10% to 42.50% by weight of said preparation and a bentonite finely divided clay, said bentonite clay constituting from .2% to 2.75% by weight of said preparation.

7. A dental preparation for cavity lining and pulp capping comprising a bodied free flowing mixture containing from about 3% to 30% of polystyrene in a non-irritating solvent therefor capable of rapid evaporation, calcium hydroxide constituting from 10% to 42.50% by weight of said preparation and a bentonite finely divided clay, said bentonite clay constituting from .2% to 2.75% by weight of said preparation.

8. A dental preparation for cavity lining and pulp capping comprising a bodied free flowing mixture containing from about 3% to 30% of an ethyl methacrylate and methyl methacrylate copolymer in a non-irritating solvent therefor capable of rapid evaporation, calcium hydroxide constituting from 10% to 42.50% by weight of said preparation and a bentonite finely divided clay, said bentonite clay constituting from .2% to 2.75% by weight of said preparation.

9. A dental preparation in accordance with claim 8 wherein said solvent is chloroform.

References Cited in the file of this patent

UNITED STATES PATENTS

| 2,333,816 | Pohle et al. | Nov. 9, 1943 |
| 2,403,172 | Crowell et al. | July 2, 1946 |

FOREIGN PATENTS

| 379,716 | Great Britain | Aug. 29, 1932 |

UNITED STATES PATENT OFFICE
CERTIFICATE OF CORRECTION

March 10, 1959

Patent No. 2,877,199

George Taub

It is hereby certified that error appears in the printed specification of the above numbered patent requiring correction and that the said Letters Patent should read as corrected below.

Column 6, line 9, strike out "in a calcium hydroxide".

Signed and sealed this 14th day of July 1959.

(SEAL)
Attest:

KARL H. AXLINE
Attesting Officer

ROBERT C. WATSON
Commissioner of Patents